Patented Jan. 8, 1946

2,392,669

UNITED STATES PATENT OFFICE 2,392,669

PURIFICATION OF ALKALI METAL SULPHATES

Alfred Hirsch, Painesville, Ohio, assignor to Diamond Alkali Company, Pittsburgh, Pa., a corporation of Delaware No Drawing. Application October 7, 1943, Serial No. 505,410

4 Claims. (Cl. 23—121)

The present invention relates to the art of purifying water-soluble sulphates, and it is particularly concerned with a method for purifying by-product alkali metal sulphates incident to the manufacture of bichromates of alkali metals and of ammonia.

In the manufacture of these bichromates there are formed sulphates of the alkali metals, predominantly sodium sulphate, which are contaminated with compounds of magnesium and trivalent and hexavalent chromium. The degree of contamination is usually such that the sulphate by-product is not suitable for glass making or other uses requiring high-purity raw materials.

Attempts to effect removal of these impurities and to recover a premium grade material having a wide demand have led to the proposal of a number of processes, only a few of which have been employed commercially. But even those methods used with the greatest success have not been operated extensively, principally because it is not possible to recover consistently a high purity unpigmented product without several repetitions of the separation treatment. As this treatment is long and tedious and requires close attention and special reagents, the margin of profit on the finished product was not such as was attractive to commercial producers of bichromates and alkali metal sulphates.

With the process of my invention, on the other hand, it is possible with a single, simple separation to produce consistently a sulphate containing such small amounts of compounds of magnesium and chromium and other heavy metals as are undetectable by ordinary means. Furthermore, my method requires fewer acidity-basicity adjustments. My method has the additional advantage that it is possible to increase the theoretical yield of purified sulphate and to recover more sulphate in the purified condition than was introduced into the process in the impure condition.

Briefly, the process of the present invention comprises the steps of dissolving in water sodium sulphate contaminated with chromium and magnesium compounds, alkalizing the resulting solution with an alkali metal hydroxide, treating said solution with a suitable amount of a suitable sulphide, separating and removing from the liquid the solids present therein, aerating and neutralizing the solution and crystallizing the sodium sulphate therefrom.

According to the preferred manner of carrying out the present invention, by-product sodium sulphate from the manufacture of bichromates, containing chromium and other heavy metals in various stages of oxidation and compounds of magnesium, is contacted with sufficient water to effect dissolution easily. In practice it will be found that it is desirable to use hot water and that an excess of about 10% of water over that theoretically required to dissolve the salt cake should be provided. A lesser quantity of water can be used successfully but necessitates either a greater degree of agitation or a longer period of contact to realize complete dissolution.

In addition to the water necessary to dissolve the sodium sulphate some is required for reaction with certain impurities and added substances and, also, to hydrate and dissolve the sodium sulphate formed during the process. The amount of water required for these purposes is, of course, only a small fraction of that required for dissolving the salt cake; but it is, nevertheless, indispensable.

I have found that any water of reasonable purity containing no more than small amounts of organic matter and dissolved inorganic materials is suitable for use in this process.

To accelerate dissolution of the salt cake, the solid-liquid mixture may be thoroughly agitated. For this purpose any conventional, mechanical, liquid-agitation means of adequate proportions is suitable; but I prefer, for reasons of efficiency and adaptability, to use an agitator of the screw propellor type.

When solution of the salt cake is complete, a suitable hydroxide is added until the solution becomes alkaline. Since it is important that the solution not be acidic and since no particular advantage is gained by making it strongly alkaline, only sufficient base is used to neutralize the acid and to establish alkalinity as indicated by phenolphthalein. For this purpose commercial grade caustic soda is preferred because it is comparatively inexpensive and readily available. In general, however, any base or mixture of basic substances capable of increasing the pH of pure water from 7.0 to about 8.5 can be employed to establish alkalinity in such solutions. But it has been found undesirable to use hydroxides of calcium, magnesium, and, with the exception of ammonia, those of elements and radicals having positive charges and standing below sodium in the electromotive series of metals.

In an alkaline solution the dissolved magnesium, iron and the like are precipitated as hydroxides and in that form can be easily separated from the salt cake remaining dissolved. Similarly, all the chromium except that in hexavalent condition is so precipitated and can be removed from the solution. Furthermore, only in an alkaline solution is it possible to oxidize to sodium sulphate the sodium sulphide not required to reduce the hexavalent chromium as hereinafter to be described.

The alkalized solution is next treated with a quantity of a suitable sulphide, for example, sodium sulphide which is slightly in excess of that molecularly equivalent to the hexavalent chromium associated with the salt cake. Thereupon the reaction symbolized as follows takes place:

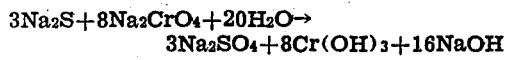
$$3Na_2S + 8Na_2CrO_4 + 20H_2O \rightarrow$$
$$3Na_2SO_4 + 8Cr(OH)_3 + 16NaOH$$

where $Na_2S$ is sodium sulphide, $Na_2CrO_4$ is sodium chromate, $H_2O$ is water, $Na_2SO_4$ is sodium sulphate, $Cr(OH)_3$ is chromic hydroxide, and $NaOH$ is caustic soda.

The amount of hexavalent chromium in the solution will determine the quantity of sodium sulphide to be added to the salt cake solution; the ratio of 3 parts of sulphide to 8 parts of hexavalent chromium being fixed by the above chemical expression. An aqueous solution of sulphate of about 25% strength, that is, one containing about 2½ pounds of sulphate per gallon of water, having dissolved therein about 0.01 pound per gallon of hexavalent chromium, will require then, about 0.004 pound per gallon of sodium sulphide. The degree of contamination of salt cake with completely oxidized chromium will vary from less than about 0.1% to more than about 0.5%, but it is not at all necessary to maintain close control over the quantity of sulphide used. By assuming a high value for the contamination and adding a slight, say about 10%, excess of sodium sulphide, complete reduction of chromates and bichromates is assured, providing that the other conditions are substantially as described.

Instead of sodium sulphide, which I prefer for use in the present process, certain other sulphides are suitable for reducing hexavalent chromium as above described. For example, sulphides of hydrogen, ammonia, and any alkali metal can be used with success. If ammonium sulphide or the sulphide of an alkali metal other than sodium is employed, however, the resulting sodium sulphate will be contaminated with the sulphate corresponding to the sulphide used. In some instances such contamination may not be objectionable and may even be desirable depending upon the use for which the sulphate product is intended. No contamination of the final, purified sulphate occurs as a result of the use of hydrogen sulphide.

Sulphides of alkaline earth metals such as magnesium and calcium and of heavy metals such as iron, copper, nickel, zinc, lead, mercury and the like are not preferred for use in reducing hexavalent chromium in accordance with the process of the present invention because they are converted to sulphates and emerge from the process associated with the sodium sulphate product. Sodium sulphate so contaminated is not of the purity usually desired and probably would not be suitable for uses requiring a premium grade raw material. Conceivably, barium sulphide can be used because the corresponding sulphate is very insoluble and can easily be separated from sodium sulphate in aqueous solution. It would, however, necessitate an additional separation operation to remove from the solution the barium sulphate precipitated following aeration and neutralization of said solution.

Mixtures of sulphides useable singly are also operable in this process. A mixture comprising sodium sulphide and hydrogen sulphide in any ratio is suitable and can be expected to yield sodium sulphate of purity comparable to that processed with either sodium sulphide or hydrogen sulphide. The term "mixture" as it is used hereinabove does not necessarily mean that a mixture prepared and added to the sodium sulphate solution to be treated; but rather it may mean a mixture resulting from the separate and independent addition of each sulphide to said solution. Hydrogen sulphide at ordinary temperatures and pressures is a gas and, under the same conditions sodium sulphide is a solid and it is, therefore, not practicable to mix the two except in a solution where both can be dissolved. As I prefer to add the sodium sulphide in the solid phase to the sodium sulphate solution, I accomplish any mixing of sulphides in the sodium sulphate solution by introducing thereinto, simultaneously, gaseous hydrogen sulphide and solid sodium sulphide.

In the preferred practice of the present invention, I thoroughly agitate the solution for a period of several minutes following the addition of the chromate-reducing sulphide. Most conveniently, the same means of agitation is used for this purpose as mentioned hereinbefore in connection with the dissolving of impure salt cake.

The solution is then passed through a filter, or is settled and decanted, or otherwise treated to separate and remove it from the precipitated chromium and magnesium hydroxides and the small amounts of hydroxides of heavy metals associated with the impure sodium sulphate. Since the purity of the final sulphate is determined directly by the effectiveness of this separation and removal of solid from liquid, this operation is critical and close control over it should be maintained. By heating the solution to a temperature of about 70° C. or higher for a short period before attempting this separation the chromium hydroxide precipitate is flocculated so that it rapidly settles and said separation is thereby expedited.

The solids may be processed to recover chromium oxide by washing with water to remove sodium salts and then drying said solids at a temperature in excess of the decomposition temperature of the hydroxide of chromium. A more elaborate method is necessary if substantial amounts of magnesium hydroxide and other substances are present in the solids and if these contaminants of the chromium compound are objectionable.

The solid-free solution is aerated in any convenient manner, for example, by introducing air under pressure below the surface of said solution. By this means oxidation of unreacted sodium sulphide to sodium sulphate is accomplished. Depending upon the quantity of sulphide in the solution, the amount of air supplied per unit of time and certain other factors, the length of the period required to complete this oxidation will vary. In commercial operation not more than one hour should be required, but the individual operator can, by making certain adjustments in conditions attending the process, increase or diminish the length of the sulphide oxidation period to suit his convenience.

When the solution becomes colorless, indicating that all the residual sulphide has been converted to sulphate, sulphuric acid is added to neutralize the caustic soda and synthesize sodium sulphate The quantity of sulphuric acid required for this purpose can be estimated very accurately by titrating a small aliquot of the solution with a dilute solution of sulphuric acid of known concentration.

By carrying out this invention in the manner described and by using sodium sulphide to effect reduction of hexavalent chromium, the theoretical yield of sodium sulphate is increased. According to the chemical reaction hereinbefore described and discussed there are 3 parts of said sulphate formed for every 8 parts of hexavalent chromium reduced. The theoretical yield is further increased by aeration of residual sulphide and its conversion thereby to sodium sulphate. Additional quantities of sodium sulphate are formed when sulphuric acid is added to neutralize the solution containing 16 parts of caustic soda for every 8 parts of hexavalent chromium reduced according to the foregoing chemical expression. If the solution is alkalized with caustic soda according to the preferred practice, neutralization of said solution with sulphuric acid will result in the formation of more sodium sulphate.

Although the process of my invention has been described in terms of sodium sulphate, it is to be understood that the other alkali metal sulphates can be similarly processed and purified.

Having thus described the present invention so that others skilled in the art may be able to understand and practice the same, I state that what I desire to secure by Letters Patent is defined in what is claimed.

I claim:

1. The method for effecting removal of compounds of heavy metals and magnesium from sodium sulphate containing hexavalent chromium compounds which comprises the steps of dissolving sodium sulphate in water, alkalizing the resulting aqueous solution, treating said solution with a metallic sulphide in quantity at least equal to that stoichiometrically equivalent to react with the hexavalent chromium combined with the sodium and produce trivalent chromium as chromic hydroxide, separating and removing from the liquid the solids present therein, aerating and neutralizing the solution, and crystallizing the sodium sulphate therefrom.

2. The method of preparing a high purity sodium sulphate from sodium sulphate contaminated with compounds of chromium and magnesium which comprises the steps of dissolving said impure sodium sulphate in water, alkalizing the resulting aqueous solution, treating the solution with a quantity of sodium sulphide at least equal to that stoichiometrically equivalent to react with the hexavalent chromium combined with the sodium and produce trivalent chromium as chromic hydroxide, separating and removing from the liquid the solids present therein, aerating and neutralizing the solution, and crystallizing the sodium sulphate therefrom.

3. The method of preparing a high purity sodium sulphate from sodium sulphate containing hexavalent chromium compounds contaminated with compounds of chromium and magnesium which comprises the steps of dissolving said impure sodium sulphate in water, alkalizing the resulting aqueous solution, treating the solution with metallic sulphides in quantity at least equal to that stoichiometrically equivalent to react with the hexavalent chromium combined with the sodium and produce trivalent chromium as chromic hydroxide, separating and removing from the liquid the solids present therein, aerating and neutralizing the solution, and crystallizing the sodium sulphate therefrom.

4. The method for effecting removal of compounds of heavy metals and magnesium from sodium sulphate which comprises the steps of dissolving sodium sulphate in water, alkalizing the resulting aqueous solution with caustic soda, treating said solution with sodium sulphide in quantity at least equal to that stoichiometrically equivalent to react with the hexavalent chromium combined with the sodium and produce trivalent chromium as chromic hydroxide, separating and removing from the liquid the solids present therein, aerating and neutralizing the solution with sulphuric acid, and crystallizing the sodium sulphate therefrom.

ALFRED HIRSCH.